W. J. BOHAN.
FREIGHT CAR.
APPLICATION FILED JULY 12, 1915.
1,228,742.
Patented June 5, 1917.
6 SHEETS—SHEET 1.
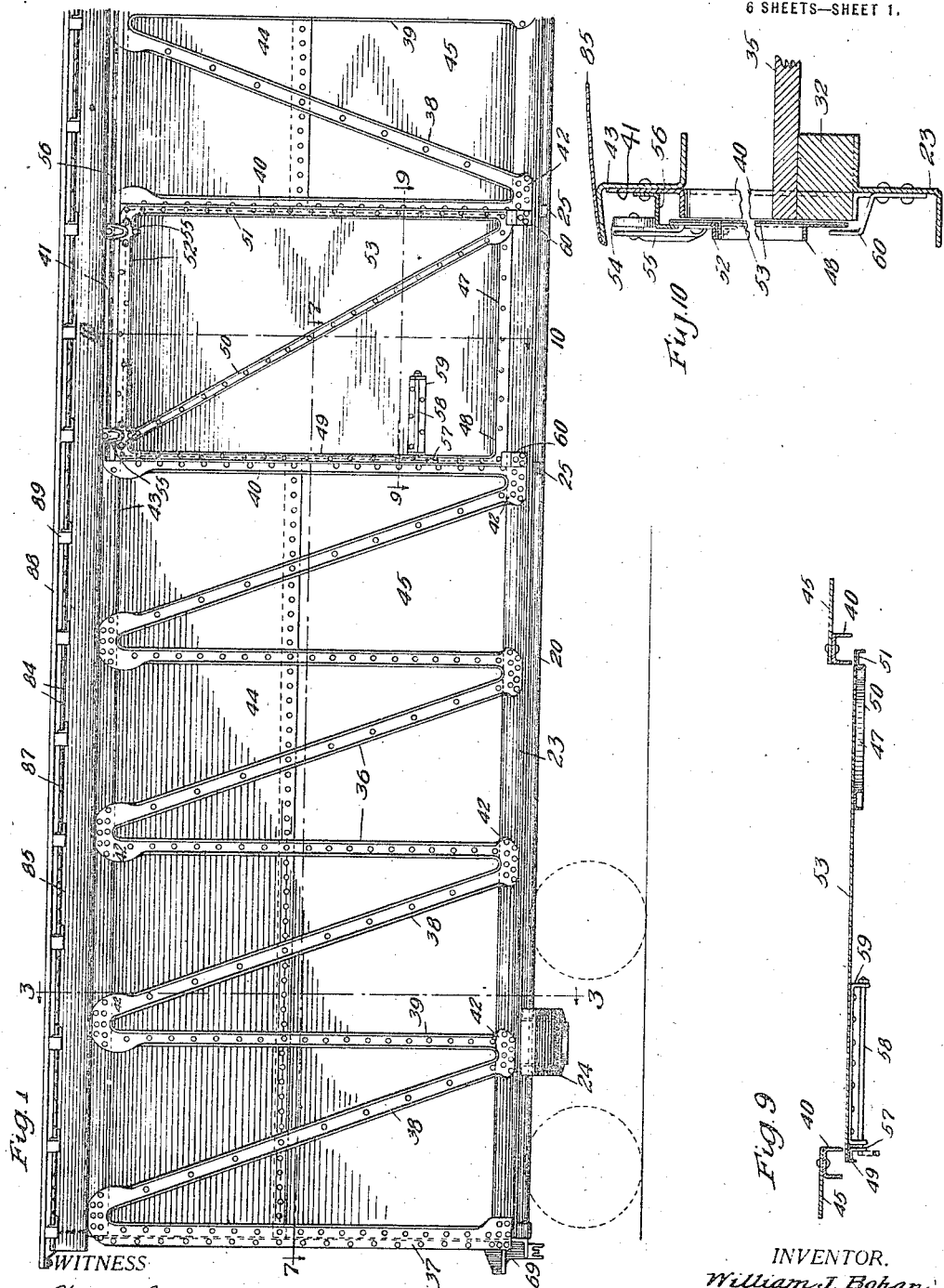
INVENTOR.
William J. Bohan
BY
ATTORNEY

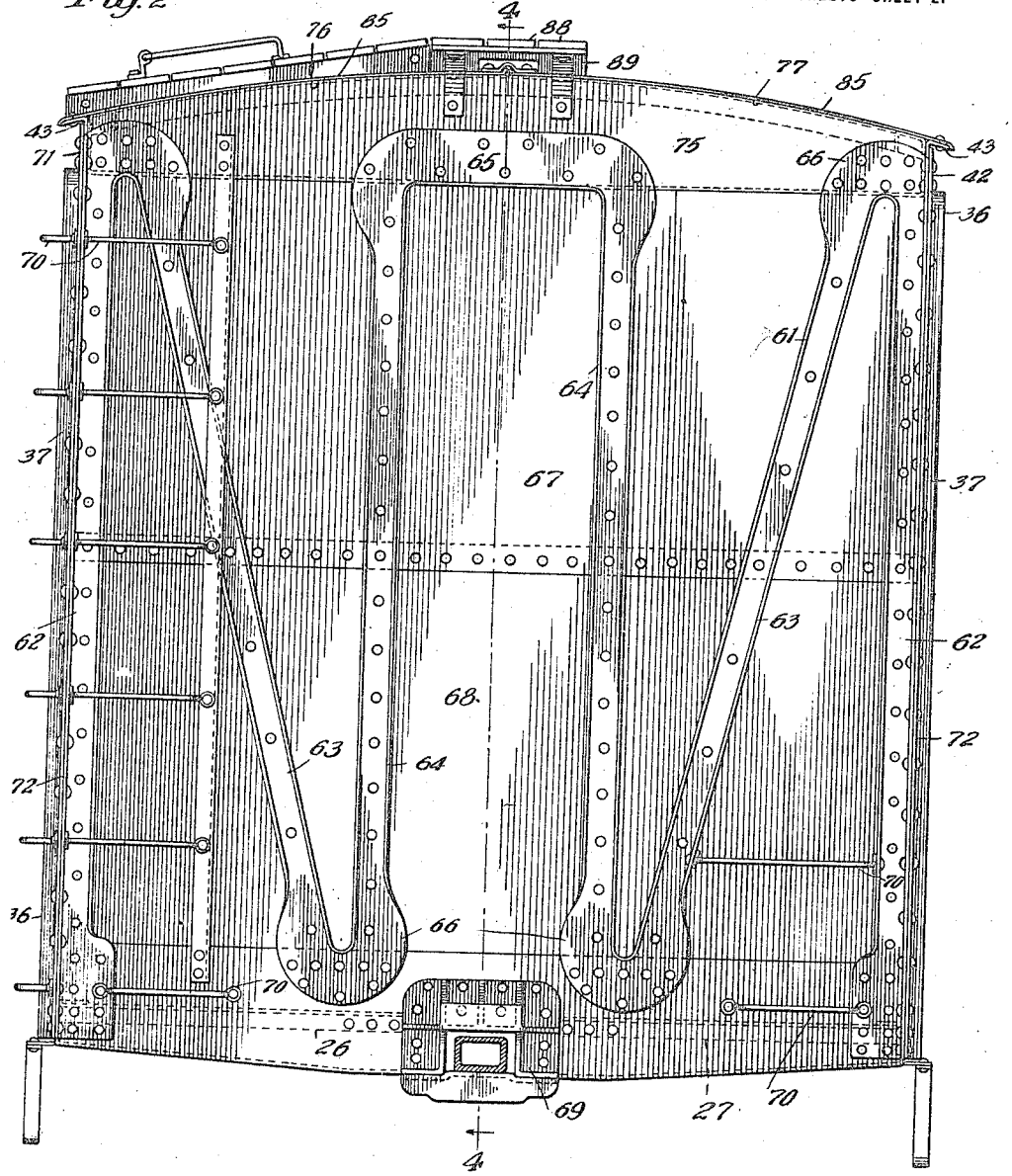

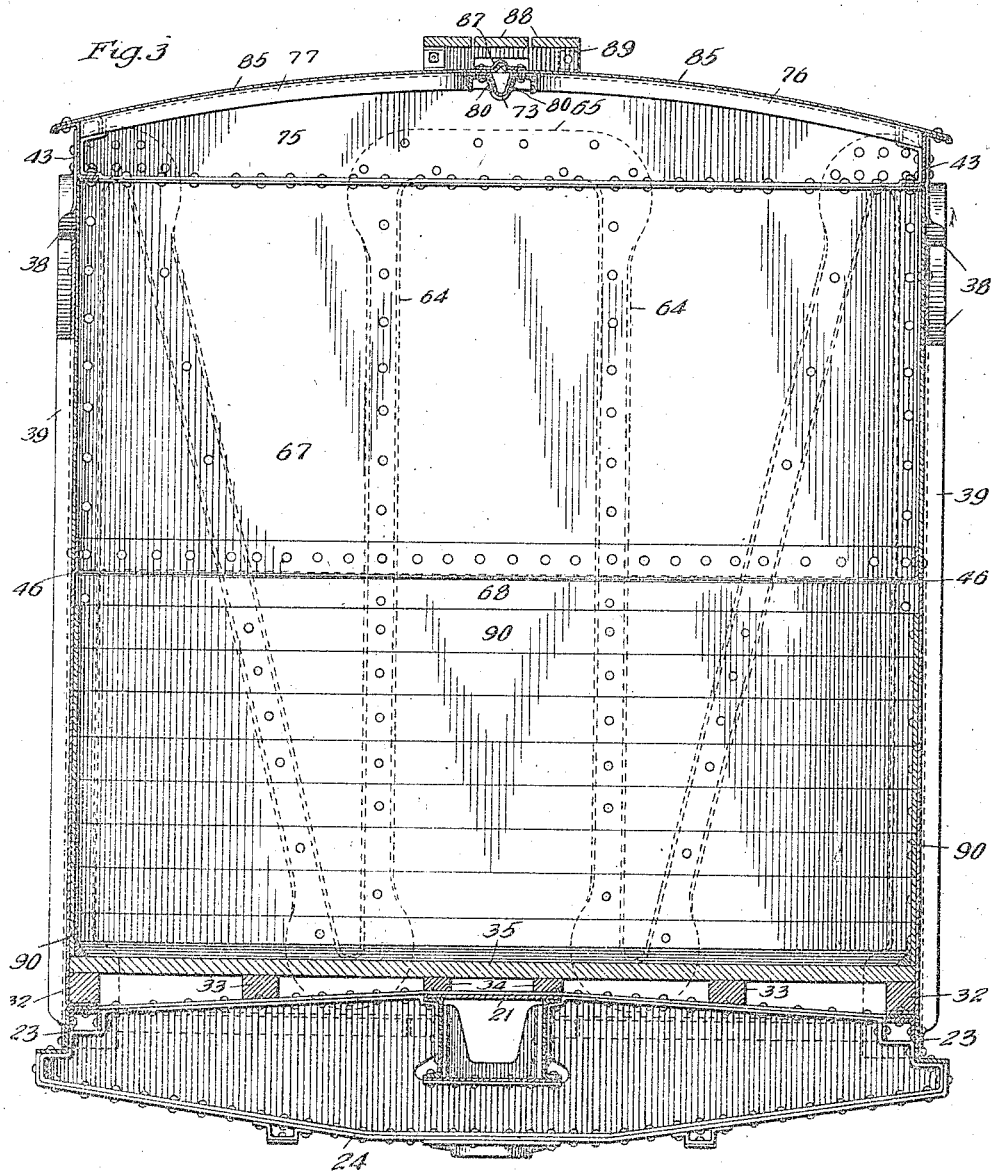

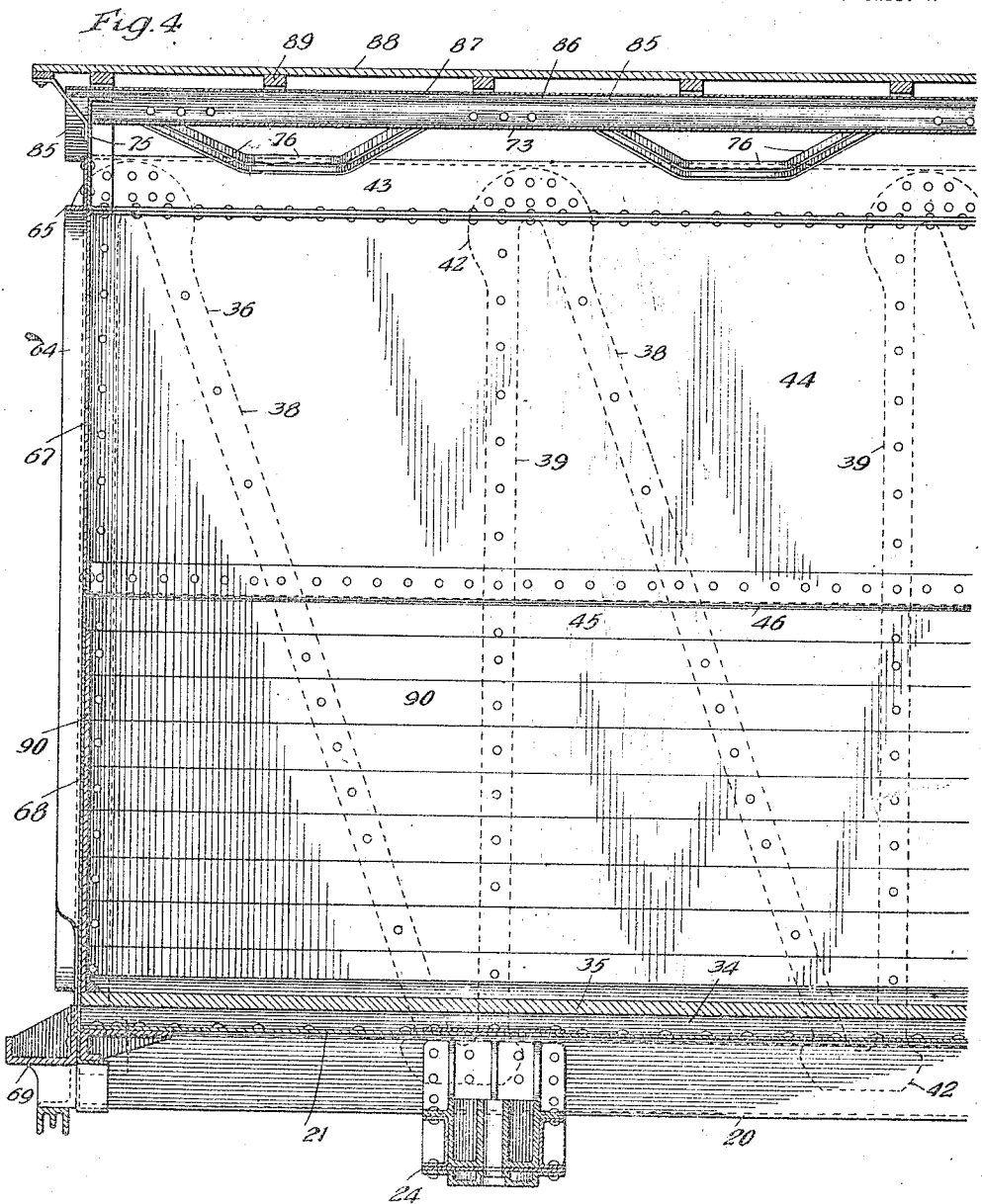

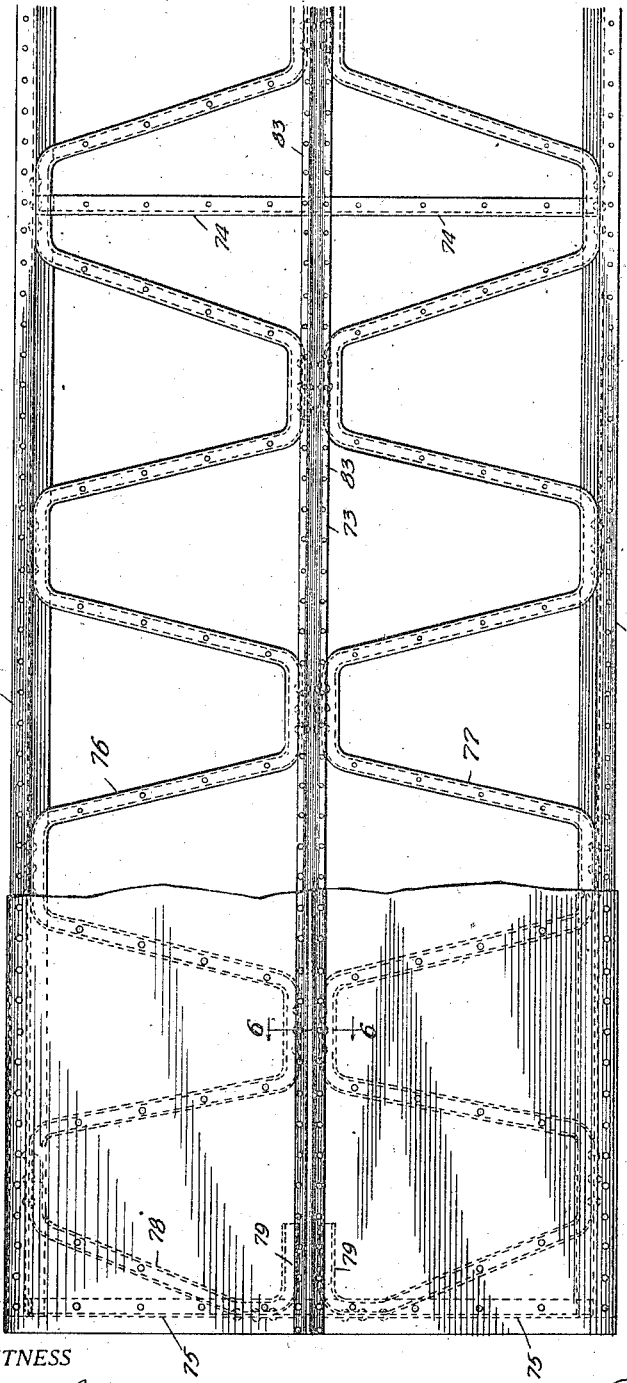

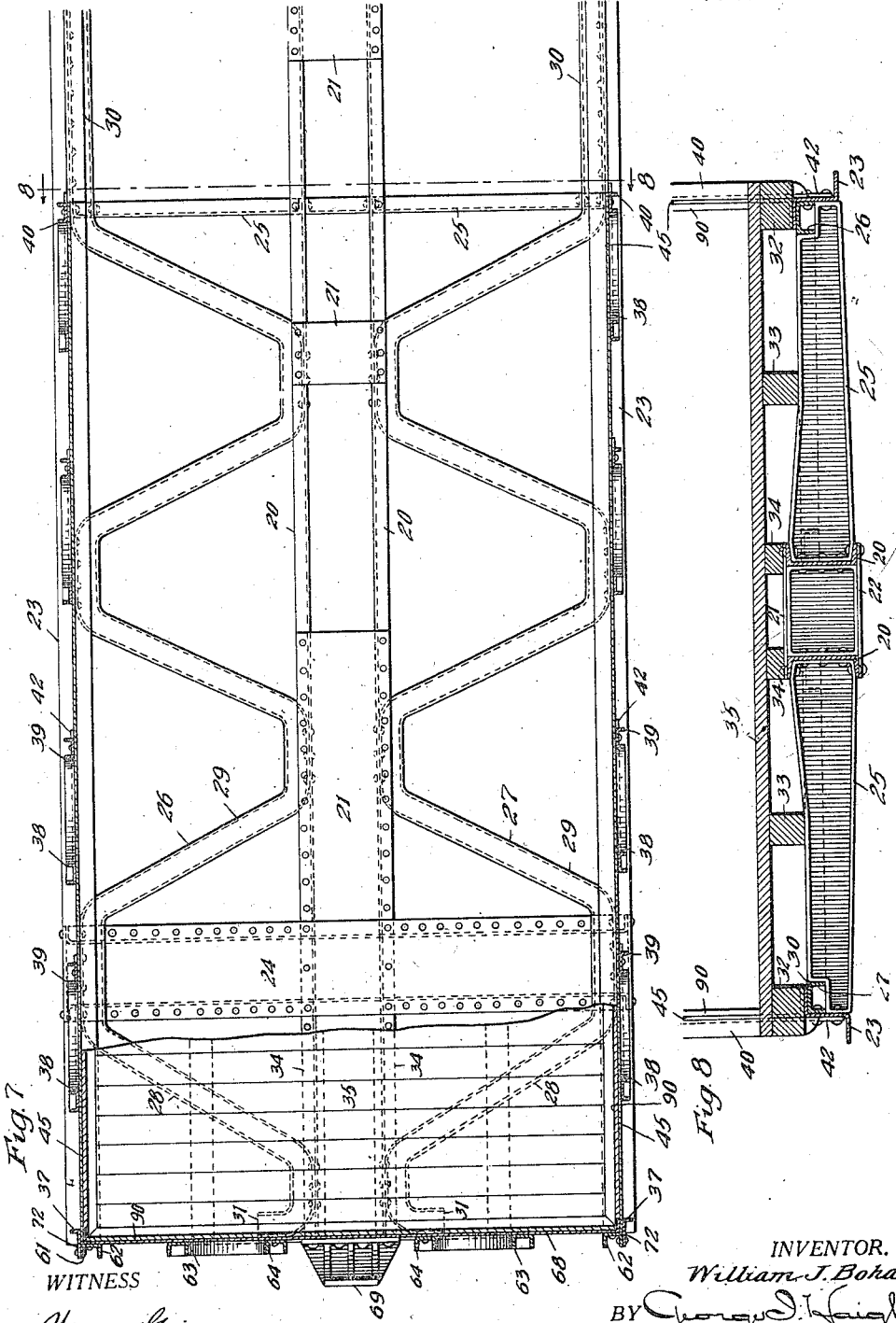

UNITED STATES PATENT OFFICE.

WILLIAM J. BOHAN, OF ST. PAUL, MINNESOTA.

FREIGHT-CAR.

1,228,742.

Specification of Letters Patent.

Patented June 5, 1917.

Application filed July 12, 1915. Serial No. 39,288.

*To all whom it may concern:*

Be it known that I, WILLIAM J. BOHAN, a citizen of the United States, residing at St. Paul, in the county of Ramsey and State of Minnesota, have invented a certain new and useful Improvement in Freight-Cars, of which the following is a full, clear, concise, and exact description, reference being had to the accompanying drawings, forming a part of this specification.

This invention relates to improvements in freight cars. One object of the invention is to provide an all metal freight car of extremely strong and rigid construction wherein novel structures are employed to support and brace the various parts, and the various parts are so arranged and designed and connected as to mutually brace and strengthen each other.

Another object of the invention is to provide a steel box car so arranged that the roof, sides, ends and floor constitute unitary structures.

Another object of the invention is to provide an arrangement wherein a preferably continuous member such as a channel or other commercial shape is utilized to form the posts and braces of the ends and sides and so designed as to give great strength where the heaviest loads are borne.

Another object of the invention is to provide a steel freight car having the parts thereof to arranged that the heavy buffing and pulling shocks are transmitted to and absorbed by all the parts of the car.

Other and more specific objects of the invention will appear from the description hereinafter.

In the drawing forming a part of this specification I have shown my improvements as embodied in a box car, but the same is merely illustrative since my improvements may be embodied in other types of freight cars such, as for instance, gondola cars. In said drawing, Figure 1 is a side elevation of a portion of a box car showing my improvements in connection therewith. Fig. 2 is an end elevation of the car shown in Fig. 1 but upon a larger scale. Fig. 3 is a transverse vertical section of the improved car taken on the line 3—3 of Fig. 1. Fig. 4 is a longitudinal vertical sectional view taken substantially on the line 4—4 of Fig. 2. Fig. 5 is a top plan view of the roof of the car, the running board and a portion of the roof plates being removed to better illustrate the construction. Fig. 6 is an enlarged detail sectional view at the ridge of the roof taken substantially on the line 6—6 of Fig. 5. Fig. 7 is a horizontal sectional view taken substantially on the line 7—7 of Fig. 1, a portion of the floor boards being removed to better illustrate the under framing. Fig. 8 is a transverse sectional view of the underframe and floor of the car taken on the line 8—8 of Fig. 7. Fig. 9 is a horizontal sectional view illustrating more particularly the side door construction and taken on the line 9—9 of Fig. 1. Fig. 10 is a vertical sectional view, upon an enlarged scale and partly broken away taken on the line 10—10 of Fig. 1.

In said drawings, the underframe of the car is shown as comprised of a pair of channel shaped center sills 20—20 connected at the tops and bottoms by tie plates 21 and 22 to thereby form a box like center sill. Z bar side sills 23—23 are employed; built-up body bolsters 24—24; and pressed needle beams 25—25; there being only two of the latter and located near the center of the car substantially in alinement with the edges of the side door openings hereinafter referred to. In order to rigidly tie the foregoing members together and rigidly brace the car underframe I employ two preferably continuous bracing members 26 and 27 each of which, as shown, is in the form of a channel having the flanges thereof turned downwardly. Each of the members 26 and 27 extends diagonally first from the center sill to the side sill as indicated at 28—28 in Fig. 7 and then inwardly from the side sill to the center sill as indicated at 29. This zigzag course of the member 26 is continuous from one end of the car to the other except where the member 26 passes between the needle beams 25—25. At this point, the member 26 extends from end to end of the pair of needle beams and follows the side sill 23 as indicated at 30—30 in Fig. 7. At their ends the members 26 and 27 are turned outwardly at right angles to the center sill as indicated at 31—31 to thereby form a rigid connection between the center sill and end structure of the car. It will also be noted that the body bolsters are braced in the most effective manner by the members 26 and 27 since the latter extend diagonally from the ends of the body bolsters to the center sill at both sides thereof. Furthermore, as clearly appears from Fig. 7 the continuous members 26 and 27 are so arranged that they are riveted to the center sill at points opposite each other thereby producing the effect of X shaped bracing between the center sill and side sills. This form of bracing is the best adapted to resist longitudinal and transverse strains as is well known. Longitudinal floor beams or sills 32, 33 and 34 are employed to which are nailed the floor boards 35 to form the floor of the car.

Referring now more particularly to Fig. 1, it will be seen that on the sides of the car, I employ a preferably continuous member 36 of channel shape, as shown. The continuous member 36 comprises end posts 37, diagonal braces 38, intermediate posts 39, side door posts 40—40 and a door lintel 41, all formed integrally. Where the diagonal braces 38—38 meet with the vertical posts at an angle, the outside flange of the channel at the angle is preferably flattened outwardly as indicated at 42—42 to thereby form a larger riveting area for securing the member 36 to the side sills 23 and upper longitudinally extending Z bars 43—43. The side walls of the car are formed by upper and lower sheet metal plates 44 and 45, the latter being slightly offset along their upper edges as indicated at 46 in Fig. 3 so that the upper plates 44 may overlap the lower plates 45 and be riveted thereto, thus forming a longitudinal seam and additionally bracing the side of the car.

By arranging the continuous members 36 so as to form arches over the side doors, I thereby secure great strength for the side walls of the car at the points where the greatest strains are exerted. A metal door is provided for each side of the car, and, as shown, the same consists of a frame formed by a preferably continuous channel shaped member 47 which has a lower horizontal leg 48, vertical side post 49, diagonal brace 50, side vertical post 51 and upper or top horizontal leg 52, the member being securely riveted to itself at the corners where the diagonal member 50 unites with the horizontal and vertical members of the frame. A sheet metal plate 53 is secured to the frame above described and the door is supported by rollers 54 carried by brackets 55, the rollers running along tracks 56 in the form of Z bars secured to the outer sides of the car near the eaves of the roof. To hold the door in closed position I have provided a stop and lock plate 57 slotted to receive the angled end of a slidable locking bar 58 mounted on a guide plate 59. Guiding brackets 60—60 are also provided at the bottom of the door to prevent the same from swinging outwardly.

Referring now more particularly to Figs. 2 and 3, it will be seen that I have employed the same idea heretofore described for the floor and sides of the car, for bracing the end of the car. In other words, I employ a preferably continuous channel shaped member 61 having formed integrally therewith end posts 62, diagonal braces 63 and intermediate vertical posts 64, the latter being connected at the top by a cross portion 65. In this instance also the outer flange at the angles formed between the diagonal braces and the vertical posts are outwardly flattened as indicated at 66 to provide a large riveting area. Upper and lower, dished end sheets 67 and 68 are riveted to the inner sides of the member 61 in a manner similar to the side sheets heretofore described. 69 indicates a cast buffer block of any well known type. Hand grabs 70—70 are provided and also end and side ladders the rungs of which are secured to a common stile 71 at the corner, which stile, as shown in Figs. 2 and 7, is a corner post of the car and consists of the outer vertical web of the end post 62 and the flattened outer flange 72 of the end post 37 of the continuous side member 36. As will be obvious, the two sets of rungs effectively brace the corner post. Not only does this arrangement provide simple means for constructing the side and end ladders but it gives an unusually strong and rigid connection between the sides and ends of the car and ties them so as to form practically one rigid structure, so that, forces applied to the end walls of the car are distributed to and partly absorbed by the side walls of the car by means of the connection above described and vice versa.

Referring now more particularly to Figs. 4, 5 and 6, the roof structure of the car, as shown, consists of the longitudinally extending outer Z bars 43—43 previously described; a central ridge pole 73; carlines 74—74 near the center of the car at the sides of and above the door; and dished end plates 75—75. The ridge pole 73 is in the form of a trough or V shaped member as clearly indicated in Fig. 6. The members 73 and Z bars 43 are connected and mutually braced by means of preferably continuous channel shaped members 76—77, the latter having zigzagging diagonal brace portions 78—78.

In the roof structure, as in the floor structure, the continuous bracing members 76 and 77 are joined to the central longitudinal member opposite each other to thereby form substantially X shaped roof bracing and thus increase the rigidity thereof and capacity to resist both longitudinal and lateral strains. At their ends, the members 76 and 77 are turned inwardly and secured to the ridge member 73 as indicated at 79—79 to thereby rigidly tie the dished end plate 75 and ridge member 73. The manner of riveting the channel shaped bracing members 76 and 77 to the ridge pole member 73 is clearly indicated in Fig. 6, where the inner flanges 80—80 of the channel shaped members are riveted by the rivets 81 and the top or web portions 82 thereof are secured to the horizontal flange 83 of the ridge member by rivets 84. Longitudinally extending roof sheets or plates 85—85 are employed, the latter having their inner meeting edges upwardly bent as indicated at 86 in Fig. 6 and a water tight joint is formed by means of a longitudinally extending cap plate 87, the rivets 84 securing the cap plate and roof sheets as clearly indicated in Fig. 6.

Running boards 88 are provided, the same being mounted on suitable saddles 89, and I have also shown the car as adapted for carrying grain and other commodities in bulk, by having the the same provided with a wood lining 90 extending part way up the sides and ends.

From the preceding description, it will be seen that I have provided a car wherein the floor structure, sides, ends, and roof mutually coöperate to brace and strengthen each other and to resist all the shocks which the car is subjected to. Also, it will be seen that the various parts of the car may be made up in units and are easily assembled. Furthermore, the arrangement which I have provided lends itself very readily to the repair of old cars now in service, particularly with regard to the ends, sides, roof and underframe.

Although I have herein shown and described what I now consider the preferred embodiment of my invention yet I do not wish to be limited to the exact details, but contemplate all changes, variations and modifications as come within the scope of the claims appended hereto.

I claim:

1. A sheet metal car, each side of which is provided with a continuous integral member extending from end to end and having vertically and diagonally extending portions forming posts and braces, respectively.

2. A car having the sides thereof provided with continuous members extending from end to end and having alternately vertically and diagonally extending portions forming posts and braces, respectively.

3. A steel box car provided with side doors, the posts and braces of the side walls throughout their entire length being formed of a continuous commercially shaped member, said member, at the center thereof having two vertical posts and an upper horizontal connecting portion forming the door posts and lintel.

4. A steel car the sides of which have vertical posts and diagonal braces formed integrally by a channel shaped member extending from end to end of the car, said channel shaped member at the angles where the diagonal braces and posts meet, having the outer flange thereof flattened down into the plane of the web to thereby provide a greater riveting area.

5. A car provided with side doors and having Z bar side sills, and a member on each side thereof extending continuously from end to end of the car, each of said members having alternate vertical post and diagonal brace portions from the ends of the car to the side door, said member having an upper horizontal connecting portion over the door.

6. A car having the ends thereof each provided with a continuous, bent commercial structural shape forming all the posts and braces thereof.

7. A car having the ends thereof provided with a continuous channel shaped member bent to form a plurality of vertical posts and a plurality of diagonal braces therebetween.

8. A steel car end having a commercially shaped member bent to form outer and inner vertical posts connected by diagonally arranged bracing members, the inner pair of posts being connected by a horizontal section of said member.

9. A steel freight car the sides and ends of which are each provided with members having integral vertical posts and diagonal bracing members, the vertical posts at the ends of the side and end walls of the car being riveted together at the corners of the car.

10. A box car of the character described, at least one wall of which is provided with a continuous, commercially shaped member bent so as to form a plurality of integral diagonal bracing portions and a plurality of integral vertical posts.

11. As an article of manufacture, a post and brace structure for railway cars comprising a commercially shaped member integral throughout and bent to form posts and diagonal braces, said member being adapted to extend from end to end of the portion of the car of which it forms the framing.

In witness that I claim the foregoing I have hereunto subscribed my name this 6th day of July, 1915.

WILLIAM J. BOHAN.